United States Patent [19]
Yatagai et al.

[11] 3,904,053
[45] Sept. 9, 1975

[54] ENGAGE-DISENGAGE DEVICE FOR CARGO-TRANSFER MEANS IN MECHANICAL CARGO HANDLING SYSTEM OF THE LOAD REPLACING TYPE

[75] Inventors: Shukuro Yatagai, Kitakyushu; Katunori Tamura, Kitakyushi, both of Japan

[73] Assignee: Japanese National Railways, Tokyo, Japan

[22] Filed: Nov. 6, 1973

[21] Appl. No.: 413,389

[30] Foreign Application Priority Data
Nov. 16, 1972  Japan .......................... 47-131170

[52] U.S. Cl. .............................. 214/310; 198/20
[51] Int. Cl.² ........................................ B65G 65/40
[58] Field of Search .... 214/309, 310; 198/20, 31 R, 198/24, 35, 167

[56] References Cited
UNITED STATES PATENTS

| | | | |
|---|---|---|---|
| 2,868,349 | 1/1959 | Edmonds et al. | 198/37 |
| 3,039,586 | 6/1962 | Holden, Jr. | 198/20 |
| 3,134,476 | 5/1964 | Pierson et al. | 198/20 |
| 3,170,572 | 2/1965 | Harrison | 209/74 |
| 3,269,565 | 8/1966 | Kemp, Jr. | 214/310 |
| 3,361,256 | 1/1968 | Harrison | 209/74 |
| 3,426,922 | 11/1969 | Massey | 214/310 |
| 3,456,773 | 7/1969 | Titmas, Jr. | 198/20 |
| 3,528,576 | 9/1970 | Runyan et al. | 214/310 |
| 3,550,747 | 12/1970 | Kornylak | 198/20 |
| 3,578,184 | 5/1971 | Schaich | 214/310 |
| 3,756,436 | 9/1973 | Lingg | 214/310 |

*Primary Examiner*—Evon C. Blunk
*Assistant Examiner*—Richard K. Thomson
*Attorney, Agent, or Firm*—Armstrong, Nikaido & Wegner

[57] ABSTRACT

The present invention relates to an engage-disengage device for a cargo-transfer device such as a fork in a palletless mechanical cargo handling system of the load-replacing type. The cargo is transferred between a cargo transfer device which is available for handling and transporting cargo in a specified unit or for storing cargo on a rack and the like, and a stationary mechanism installed on the floor of a truck or container or on a cargo-handling platform. The device is equipped with a plurality of slots to receive a plurality of tines in the fork, characterized by making it possible to load or unload said fork automatically without unpacking and with no manpower needed.

A fixed frame is provided which is equiped with plural rows of cargo transport mechanisms arranged in parallel and spaced apart. A vertically-movable frame is equipped with a plurality of vertically-movable transport mechanisms for the cargo-transfer device arranged between said cargo-transport mechanisms. The cargo-transport mechanism is provided with a conveyor which carries cargo. The top surface of the transport mechanism for the cargo-transfer device is located higher than the top surface of said fixed frame. By displacing the transport mechanism for the cargo-transfer device downward along the fixed frame, a piece of cargo on said cargo-transfer means can be transferred to the fixed frame. The cargo-transfer device is displaced further down and tilted such that it moves by itself. The cargo transferred to the fixed frame is forwarded on a conveyer belt to its destination. The system may be operated in a reverse direction to load said devices.

5 Claims, 15 Drawing Figures

ENGAGE-DISENGAGE DEVICE FOR CARGO-TRANSFER MEANS IN MECHANICAL CARGO HANDLING SYSTEM OF THE LOAD REPLACING TYPE

BACKGROUND OF THE INVENTION

Palletization is popular as a method of mechanical handling of cargo. Under this system of mechanical handling, a piece of cargo placed on a pallet is treated as one unit. The pallet, however, must accompany the piece of cargo throughout the process of transport and accordingly the pallet cannot be turned to other uses before the piece of cargo, reaching its destination, is unpacked or unloaded.

Moreover, much space, time and money are wasted by keeping empty pallets or returning them to transship points after unloading; and this causes a heavy burden on individual enterprises. For this reason, individual enterprises are striving, yet with no success, for pooling the pallets for joint utilization. Under these circumstances, each enterprise is compelled to hold more than the necessary number of pallets and the investment and maintenance expense involved amounts to tremendous sums.

As a method for excuting mechanical handling which is free from the above-mentioned drawbacks inherent in the palletized system, a palletless mode of mechanical handling with the consistent use of one and the same system has been found effective.

The new methods comprises a cargo transfer means (fork) which can handle and transport a cargo in a specified unit or is available for storing cargo on rack; and a stationary mechanism installed on the floor of a truck or container or on the cargo-handling platform, and equipped with a plurality of slots to receive a plurality of tines of the fork, whereby palletless mechanical handling of cargo can take place between said fork and the stationary mechanism by the load-replacing principal.

Said method is intended for excution of cargo handling from origin to destination of shipment consistently by a load-replacing principal comprising said fork and said stationary mechanism.

Under this mechanical handling system, however, there is up to the present no effective alternative to manual handling for consignor moving the unitized shipment onto the stationary mechanism at the origin or for removing said unitized shipment from the stationary mechanism at a destination to which it has been transported by said mechanical handling method and delivering it without breaking the unit to the consignee.

SUMMARY OF THE INVENTION

The present invention comprises a fixed frame equipped with plural spaced rows of cargo-transport mechanisms arranged in parallel; and a vertically-movable frame equipped with a plurality of transport mechanisms for cargo-transfer means that can move vertically between said cargo-transport mechanisms. The cargo-transport mechanisms are provided with a conveyor or the like that can move cargo and the transport mechanisms for the cargo-transfer means are constructed such that they can carry the cargo-transfer means. The vertically-movable frame is provided with a vertical displacement mechanism which is so constructed that it can displace vertically the transport mechanisms for cargo-transfer means in the vertical space between the cargo-transport mechanisms. The cargo-transport mechanism of the fixed frame consists of an endless conveyor belt having a horizontal and a vertical part; said conveyor belt is driven at the same speed in the same direction by the same drive source. The top surface of the horizontal part in said conveyor belt may be located slightly higher than the top surface of the fixed frame and is preferrably provided with more than one free roller which keeps in contact with the under side of the conveyor belt located above the horizontal part.

The vertical displacement mechanism in the transport mechanism for cargo-transfer means preferrably comprises crossed arms of equal length from a center point. One pair of ends of the crossed arms are fitted respectively to a specified position at the bottom end of the vertically-movable frame and at the bottom of the vertical part of the fixed frame, while the other pair of the ends of crossed arms are so fitted that said crossed arms move along guide rails. The center shaft where the arms cross is provided with a displacement device for vertically displacing the center shaft. Vertical displacement of the displacement device causes a change in the scissor angle of the crossed arms, which results in a vertical displacement of the transport mechanism for the cargo-transfer means.

Preferrably the transport mechanism for the cargo-transfer means is provided with a stopper in contact with the underside of the other end of said transport mechanism for the cargo-transfer means to prevent the cargo-transfer means from being displaced further down when the cargo-transfer means comes down to a certain level. The stopper causes the transport mechanism for cargo-transfer means to tilt and move under its own weight in a specified direction.

Further it is desirable that the upper end of the crossed arms on the other side be shiftable along a guide located above with a certain inclination, so that after the transport mechanism for cargo-transfer means is displaced downward to a certain extent, the end of the crossed arms may be shifted along the upper inclined part of said guide and as a result the end may come to be located by tilting and displacement at a position lower than the other end of crossed arms, thereby helping smooth the transfer of said cargo-transfer means from said other end to the transport mechanism for the cargo-transfer means.

BRIEF DESCRIPTION OF THE DRAWINGS

FIG. 1 is an oblique view illustrating the cargo-transfer means and the stationary mechanism to be used in mechanical handling to which the present invention is applied.

FIG. 2 is a side view showing a partial section of an embodiment of the present invention.

FIG. 3 is a plan view corresponding to FIG. 2.

FIG. 4 is an elevation view corresponding to FIG. 2.

FIG. 5 is an oblique view corresponding to FIG. 4.

FIG. 6 (*a*) is a plan view illustrating the relative dimensions of the fixed frame and the vertically-movable frame in the present invention.

FIG. 6 (*b*) is a plan view of cargo-transfer means matching FIG. 6 (*a*).

FIGS. 7 (a) and (b) are side views illustrating the actions of the vertical displacement mechanism in the vertically-movable frame of the present invention.

FIG. 7 (c) is an oblique view illustrating the bottom face of the vertically-movable frame 13.

FIG. 7 (d) is a cross sectional view illustrating structural relation between guide rail 31 and roller 32.

FIGS. 8 (a) – (d) are side views illustrating the process of action according to the present invention.

DESCRIPTION OF THE PREFERRED EMBODIMENT

Referring to FIGS. 1 to 8 (d), the engage-disengage device for a cargo-transfer means in a mechanical handling system of the load-replacing type according to the present invention is to be described in detail.

Figure 1:
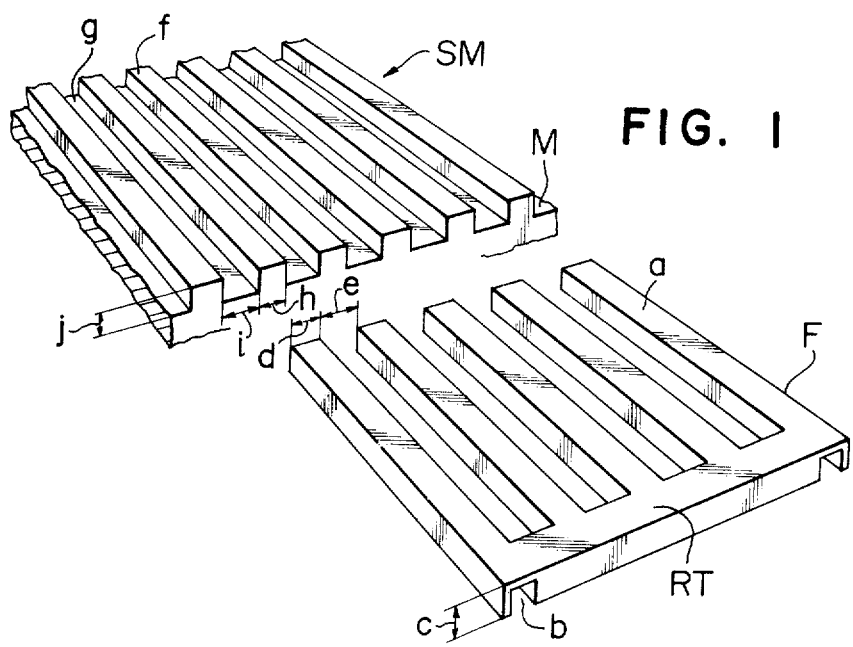
FIGS. 1 to 8 (*d*) depict the details of the present invention.

FIG. 1 illustrates the system of mechanical handling to which the present invention is applicable, including the cargo transfer means (hereinafter to be called fork) and the stationary mechanism to be employed in this system.

The fork F is made of, say, metal; and equipped with a plurality of tines $a$. Slots $b$ to receive the forks of a known forklift or handlift are formed in the longitudinal direction of the tines at specified positions along the bottom of the fork.

SM is stationary mechanism which is the floor of a truck, a container, a cargo-handling platform or a rack. On the top surface of its base M, are integrally formed a plurality of ridges $f$ of equal height and width disposed in parallel with equal spacing.

The fork F and said stationary mechanism SM are structurally correlated such that the relation between the width of $h$ of the ridge $f$ on the stationary mechanism and the spacing $e$ of the tines $a$ of the fork F is always $h<e$; and the relation between the spacing $i$ of the ridges $f$ on the stationary mechanism SM and width $d$ of the tines $a$ of the fork F is always $i>d$, making it possible for the tines $a$ of the fork F to go simultaneously into the recessed $g$ between the corresponding ridges $f$ on the stationary mechanism SM.

Meanwhile the height $j$ of the ridge $f$ is set greater than the height $c$ of the fork F.

Therefore, now suppose a piece of cargo is put on the stationary mechanism SM. Then said piece of cargo can be placed onto fork F by upward displacement after the tines $a$ of the fork F go into the recesses $g$ between the corresponding ridges $f$. Conversely, by downward displacement between the ridges $f$ of the stationary mechanism SM, of the tines $a$ of the fork F on which the piece of cargo is placed, said piece of cargo can be placed from the fork F onto the stationary mechanism SM.

Thus, if such a stationary mechanism is laid on transport means such as railcars or trucks and at specified sites of transship points on the path of transport; and such a fork is attached to the forklift trucks which move between two such stationary mechanism, cargo transfer will be effected by operation of the forklift trucks in a consistent mechanical handling system of load replacing type with the combination of a fork and a stationary mechanism. Such a system will eliminate the drawbacks of the conventional system such as the wastes in space, time and money due to the more than necessary number of pallets being held and empty pallets being stored or returned to tranship points.

Such a mechanical handling system, however, is beset with a problem, i.e., there is at present no effective alternative to manual handling for consignor moving the unitized shipment onto the stationary mechanism at the origin or for removing said unitized shipment from the stationary mechanism at a destination to which it has been transported by said mechanical handling method and delivering it without breaking the unit to the consignee.

The present invention aims at dissolution of the above difficulty inherent in the above-mentioned mechanical handling system.

In FIGS. 2 to 8 (d), the fixed frame 1 is a metal structure of an inverted-L shape, with a box-like cross section, which has a horizontal portion PL and a vertical portion VT, the frame holds a built-in conveyor belt 4. As seen from FIG. 2, the conveyor belt 4 is an endless belt stretched tight by the pulleys 2, 7, 9 and 22. On the top surface of the fixed frame 1 there are parallel portions 2–9, 2–7 and these parallel portions come down at the pulleys 7 and 9 until the periphery of pulley 22 is reached.

The material of the conveyor belt 4 may be anything, say, leather, rubber or steel, provided it is one convenient for cargo handling that has enough tensile strength to stand the load; it may even be chains.

Among the pulleys 2, 7, 9, and 22, for instance, 22 is the driving pulley which is keyed to the drive shaft 42 to drive the conveyor belt 4. All of the other pulleys 2, 7 and 9, are fitted to the shafts 3, 8 and 10 with the ends fixed to the fixed frame 1 and are freely rotatable. On the top surface of the fixed frame 1 are rollers 5 which are clearance-fitted to a plurality of shafts 6 with the ends fixed to the fixed frame 1. The axial length of the rollers 5 are set slightly greater than the width of the conveyor belt 4 and the upper side of the rollers 5 are located slightly higher than the top side of the fixed frame 1.

Figure 3:
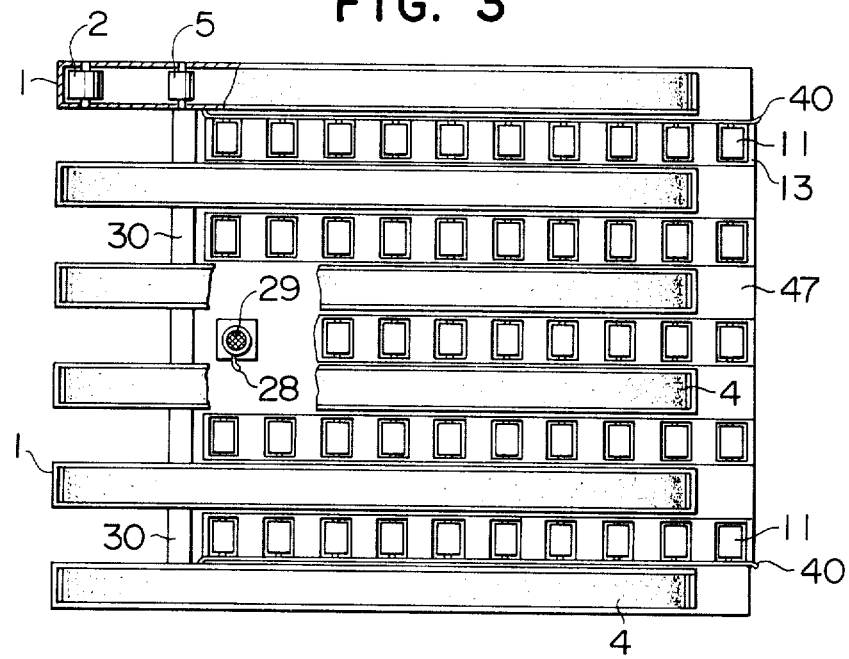
Figure 4:
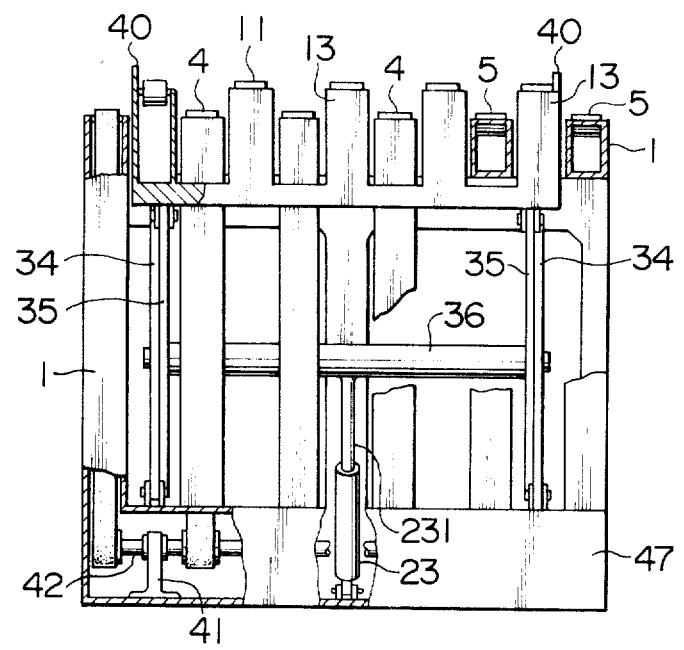

These rollers 5 serve to prop up the part 2–9 of the conveyor belt 4 so that cargo may not be damaged by excessive load or a wasteful resistance may not develop when the conveyor belt 4 is loaded with cargo. As indicated in FIG. 3, plural rows of fixed frames holding such a built-in conveyor belt 4 are installed, but the number of these rows is always set greater by one than the number of the tines $a$ of the fork F. These rows are equispaced in parallel. The lower end of each upright portion VT is integral with the drive shaft axle box 47 on the bottom, and the other end of the horizontal portion PL of the fixed frame 1 is supported by the post 30, thereby assuring ample rigidity against the external forces.

All the conveyor belts 4 are designed such that they are simultaneously driven by means of the pulley 22 fixed to a single drive shaft 42 which is coupled to a plurality of bearings 41 installed within the axle box 47.

The prime mover 18 is set parallel to the drive shaft 42. A sprocket 19 is fitted to the output shaft of the prime mover 18, while a sprocket 21 is fitted to the drive shaft 42 at a position corresponding to the sprocket 19. An endless chain 20, is stretched between the two sprockets, which transmits the torque from the prime mover 18 to the drive shaft 42. Of course both normal and reverse rotations are possible. From the standpoint of convenience for automatic control, a three-phase a-c motor is recommendable as the prime mover 18; a hydraulic motor or an internal combustion engine may also be used.

Figure 5:
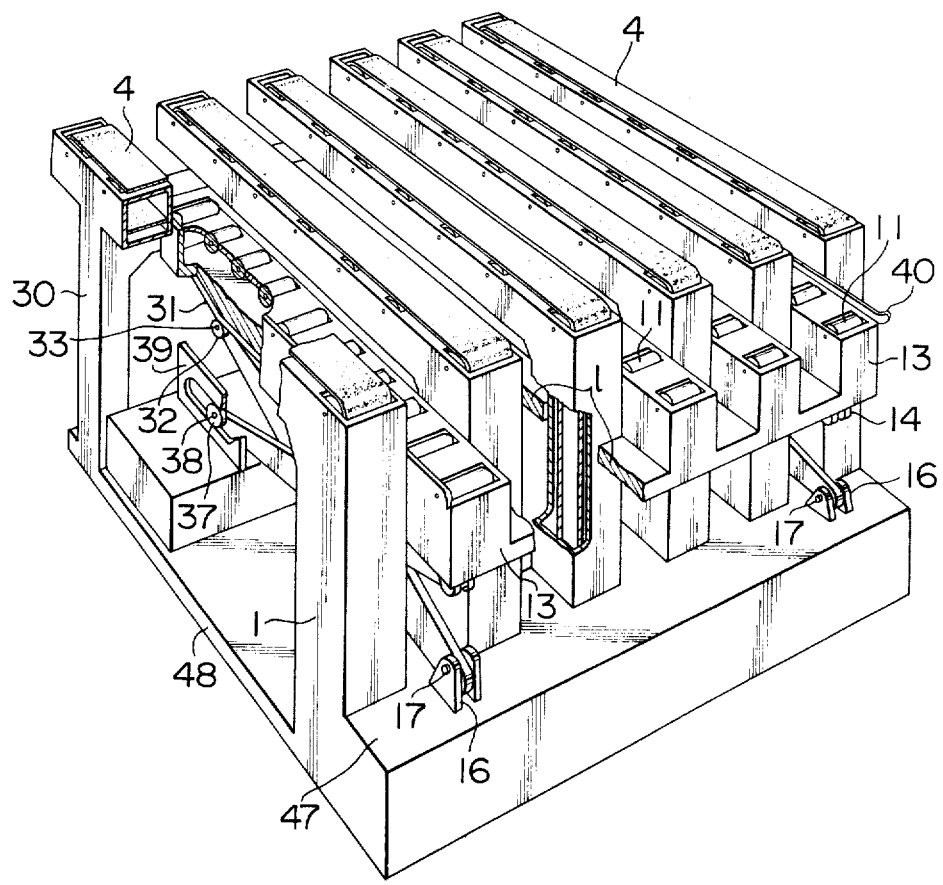

The vertically-movable frame 13 is a structure of metal, with a box-like cross section. This frame is intended for loading and moving only the fork F by vertical displacement when the fork F is engaged with or disengaged from cargo. There are as many rows of them as the tines $a$ of the fork F, equispaced in parallel between the fixed frames. The under side is, as shown in FIG. 5, integral with the plate $l$.

Figure 2:
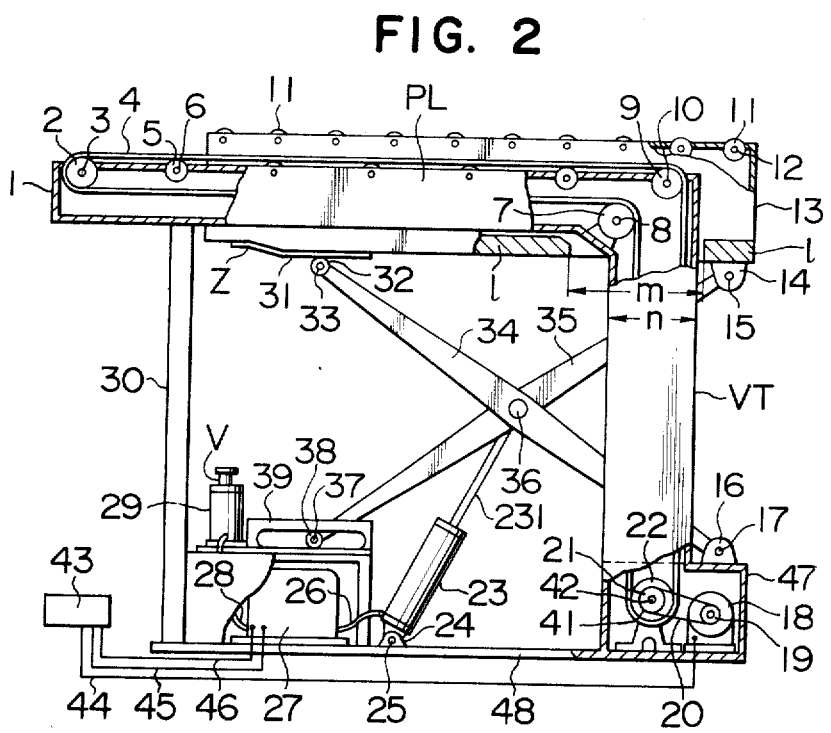

In the portion of said plate $l$, as indicated in FIG. 2, a square notch with a width $m$ larger than the width $n$ of the upright portion VT of the fixed frame 1 is cut such that the upright portion VT of the fixed frame 1 may fit into said notch, thereby permitting the vertically-movable frame 13 to smoothly move vertically between fixed frame 1.

Vertical movement of said vertically-movable frame 13 is effected by changing the scissor angle of crossed arms 34 and 35 which are symetrical about the center shaft 36. The angle change is made by means of the hydraulic ram 231 whose one end pushes the center shaft 36. The other end of the cylinder 23 for said hydraulic rams 231 is pinned at 25 to the bracket 24 fastened with the base part 48 of this device, the end being rotatable around the pin 25 within the necessary range. The hydraulic cylinder 23 is connected via a high-pressure hose 26 to the hydraulic pump 27. One pair of ends of crossed arms 34 and 35 are clearance-fitted with pins 15 and 17 respectively to the brackets 14 and 16 fastened respectively with the lower bottom side of the vertically-movable frame 13 and with the drive shaft axle box 47. The other pair of ends are immovably fitted by the pins 33 and 37 to the rollers 32 and 38 which have concave periphery such that said rollers can smoothly roll along the guide rails 31 and 39 thereby causing the vertically-movable frame 13 to be vertically moved in a horizontal position.

Rollers 11 are fitted on the top surface of the vertically-movable frame 13 and rotate about a plurality of shafts 12 fixed at both ends to the vertically-movable frame 13. The peripheral surface of the roller 11 is slightly higher than the top surface of the vertically-movable frame 13, so that the tines $a$ of the fork F can come over the rollers 11 and thereby under an external force, say, the pressure of a pusher, or under an inclination of the vertically-movable frame 13 (this point will be explained later) itself, the weight of the fork F can cause the vertically-movable frame to slide smoothly in the longitudinal direction. Depending on the case, the roller 11 may be designed to be self-rotatable. At both ends (at the extreme ends of all the vertically-movable frames installed) on the top surface of the vertically-movable frame 13 there is provided, as shown in FIG. 3, outwardly flaring guides 40 which act so that the fork F may be guided onto the vertically-movable frame 13 and the tines $a$ of the fork F may not get out of respective vertically-movable frames 13.

Figure 6A:
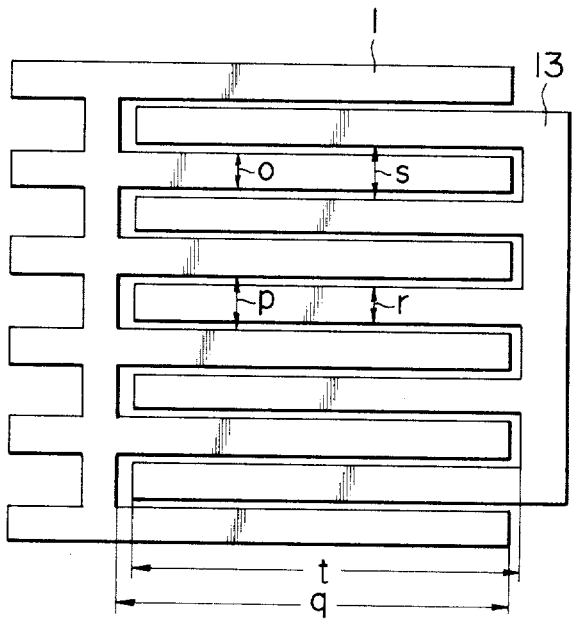
Figure 6B:
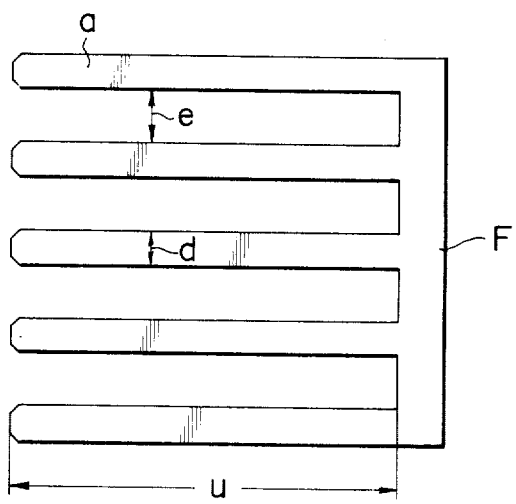
Figure 7A:
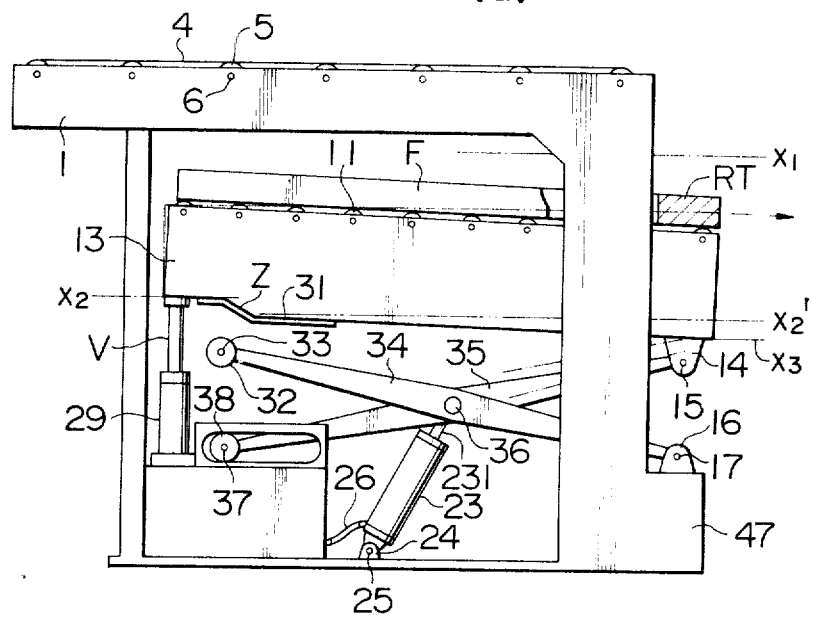
Figure 7B:
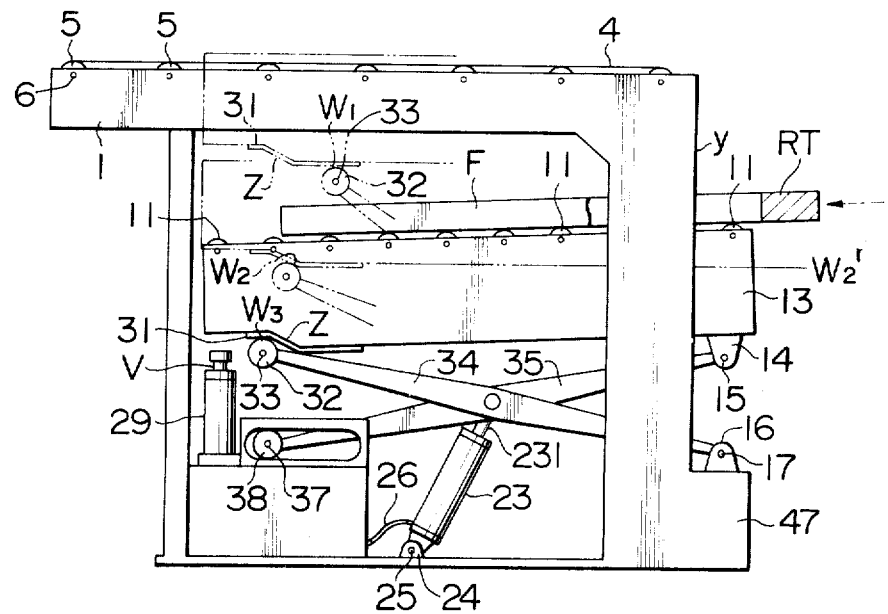
Figure 7C:
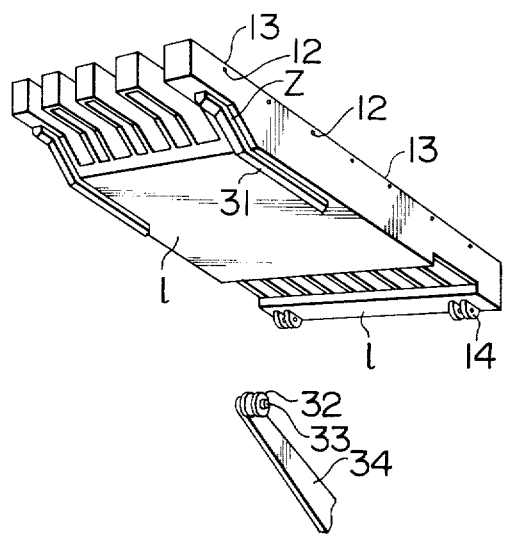
Figure 7D:
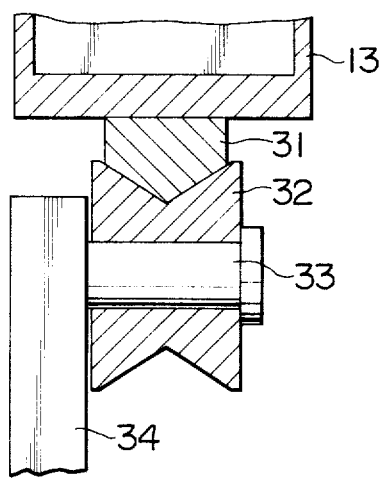
Figure 8A:
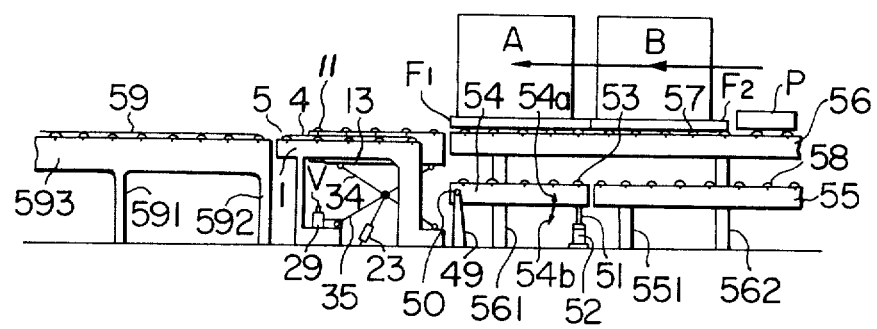
Figure 8B:
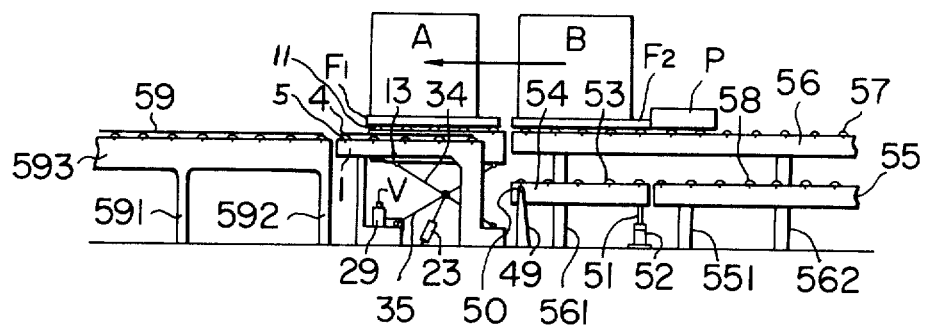
Figure 8C:
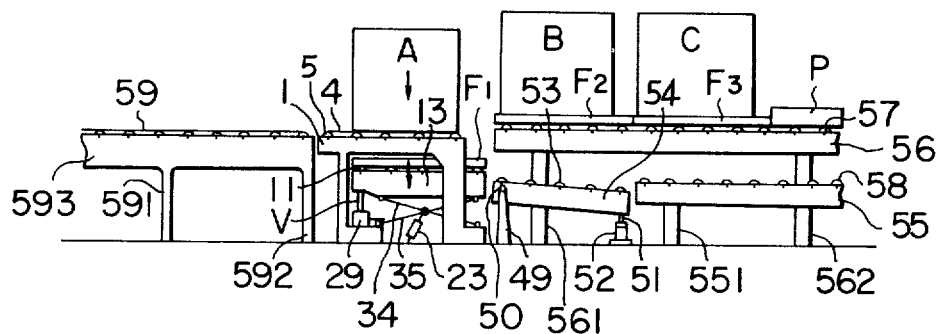
Figure 8D:
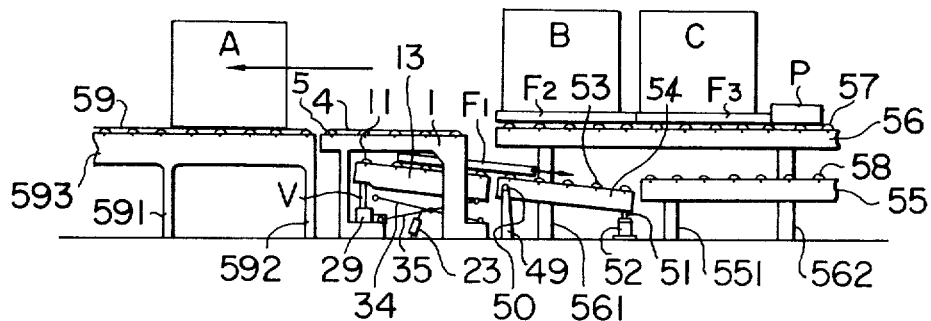

Referring to FIG. 6, the dimensional relationship among the fixed frame 1, the vertically-movable frame 13 and the fork F and their movements are to be explained.

FIG. 6 (a) is a plan view showing a combination of the fixed frame 1 and the vertically-movable frame 13.

FIG. 6 (b) is a plan view of the fork F drawn referring to FIG. 6 (a).

In FIGS. 6 (a) and (b):

The width of a fixed frame 1 is $o$;
the spacing of fixed frames is $p$;
the effective length of a fixed frame 1 is $q$;
the width of a vertically-movable frame 13 is $r$;
the spacing of vertically-movable frames 13 is $s$;
the effective length of a vertically-movable frame 13 is $t$;
the width of a tine $a$ of the fork F is $d$;
the gap between tines $a$ of the fork F is $e$;
the effective length of a tine $a$ of the fork F is $u$. The dimensional relationship between the fixed frame 1 and the vertically-movable frame 13 is as follows:

$$o<s, p>r, \text{ and } q>t,$$

and the dimensional relationship between the vertically-movable frame 13 and the fork F is as follows;

$$r \geq d, s \leq e, \text{ and } t \geq u,$$

Accordingly, the relation between the fixed frame 1 and the fork F is as follows;

$$o<e, p>d, \text{ and } q>u.$$

Thus the fork F mounted on the vertically movable frame 13 which is moved by the crossed arms 34 and 35 is free to move smoothly together with the vertically-movable frame 13 in the vertical direction through the gap between fixed frames.

Details of the vertical displacement mechanism in the vertically-movable frame 13 are shown in FIG. 7.

FIG. 7 (a) illustrates the fork F, which has delivered cargo onto the conveyor belt 4, is then shifted onto the fork transfer means (not shown) which adjoins the present device.

In FIG. 7 (a), when the crossed arms 34 and 35 reach the topmost position, the bottom of the vertically-movable frame 13 (description is to be made referring to this bottom surface) comes to the position $X_1$. At this position the top surface of the vertically-movable frame 13 is, as seen from FIG. 2, located higher than the top surface of the fixed frame 1 and a piece of cargo as carried on the fork F is put on a plurality of rollers attached to the top surface of the vertically-movable frame 13. Now, as the vertically-movable frame 13 is gradually lowered by the action of the hydraulic ram 231 on the crossed arms 34 and 35 which suppport the vertically-movable frame 13, only the piece of cargo leaves the fork and goes onto conveyor belt 4 installed on the top surface of the fixed frame 1. The fork F, stays on the rollers 11 of the vertically-movable frame 13, and is further lowered. Thereby if the ram V has been raised to the topmost position $X_2$ by operation of the vertically-movable frame-tilting device 29, the bottom left end of the vertically-movable frame 13 which has come down horizontally to the position $X_2-X_2'$ contacts the ram V at position $X_2$ and its downward movement is stopped. However, the hydraulic ram 231 is able to contract more, thus the crossed arm 34 and 35 go down further and the right side of the vertically-movable frame 13, tilt with its right side down, reaching the position $X_3$ where it stops.

Stopping at the position $X_3$ is effected by setting the contractability of the hydraulic ram 231 such that its contractability may be completed when the crossed arms 34 and 35 reach this position or by providing a stopper which arrests the right side of the vertically-movable frame 13 from further-downward movement. When the vertically-movable frame 13 is thus tilted the fork F staying on the rollers 11, positioned on the top surface of the vertically-movable frame 13, moves under its own weight in the arrow direction until it is on a fork transfer means (not shown) which separately adjoins the present device. Incidentally, as the vertically-movable frame-tilting device 29, a hydraulic cylinder of prior art is used; said vertically movable frame-tilting device 29 is connected via a high-pressure hose 28 to the hydraulic pump 27.

FIG. 7 (b) shows the reverse of FIG. 7 (a).

Namely, it illustrates the process of the fork F being loaded onto the vertically-movable frame 13 before a piece of cargo is replaced onto fork F. In this case, said vertically-movable frame-tilting device 29 is not used and the ram V is kept withdrawn. Instead, the sloping part Z of the guide 31 attached to the left part of the vertically-movable frame 13 is utilized.

That is, the sloping part Z is automatically tilted to the left at the same time as the vertically-movable frame 13 is lowered and thereby the fork F is replaced from the adjoining fork transfer means onto vertically-movable frame 13.

Now suppose the crossed arms 34 and 35 are at the topmost position and accordingly the roller 32 at the tip of the arm 34 is at the position $W_1$. If the arms 34 and 35 are gradually lowered by the action of the hydraulic ram 231, the vertically-movable frame 13 will continue to come down horizontally as indicated by $W_2$ — $W_2'$. With further lowering, however, the roller 32 passes the point $W_2$ and reaches the sloping part Z, whereupon the left part of the vertically-movable frame 13 begins under its own weight to turn about the axis 15 of the left bracket 14 and tilt to the left, finally stopping at the point $W_3$, where the greatest tilting angle is attained. Thus, it is designed such that the contractability of the hydraulic ram 231 becomes zero just at this position. Thereafter the fork F, leaving the fork transfer means (not shown) adjoining to the right of the present device, will go down the sloped vertically-movable frame 13 in the arrow direction. The vertically-movable frame 13 equipped on the top side with free-rotatable rollers 11, the fork F can smoothly move on the vertically-movable frame 13. It stops when the roots RT of the comb-like tines a of the fork F hit the upright side part y of the fixed frame 1, thus ending the replacement of the fork F onto the vertically-movable frame 13. Upon completion of replacement operation, the vertically-movable frame 13 goes up and the fork pushes up from under a piece of cargo which has been put on the fixed frame 1; thereby the loading of the fork with the piece of cargo is finished.

The above is an outline of the performance of the present device. The driving of the conveyor belt 4, the vertical movement of the vertically-movable frame 13 and the operation of the vertically-movable frame-tilting device 29 can be freely controlled over the control cables 44, 45, 46 from the centralized control board 43 installed in the vicinity of the present device.

A practical application of the present device is as follows;

In FIG. 8 (a):

1. The unitized cargos A and B mounted on the fork $F_1$ and $F_2$ are moved over the free rollers 57 arranged at specified intervals on the top surface of the transfer means 56 by the pusher p in the arrow direction and are stopped at the indicated position. Thereby as the pusher p, for instance, a piston mechanism in the prior art may be used; and the front ends of the piston rod moved forward by said piston mechanism pushes the rear ends of the fork $F_2$ in the arrow direction, the axial length of the free rollers 57 is set nearly equal to the width of the Fork $F_1$ or $F_2$. If necessary, a guide can be provided on the transfer means 56 so that said fork $F_1$ or $F_2$ may be smoothly moved on the vertically-movable frame.

2. Thereby the vertically-movable frame 13 is set at the topmost position, when the top surfaces of the transfer means 56 and the vertically-movable frame 13 are located on the same horizontal plane.

In FIG. 8 (b):

3. Pieces of cargo A and B are further pushed along by the pusher P. The piece A, together with the fork $F_1$, are placed onto the rollers 11 of the vertically-movable frame 13, the piece B being left in standing position as indicated.

in FIG. 8 (c):

4. When the vertically-movable frame 13 is lowered, the piece of cargo A is placed onto the conveyor belt 4 installed on the fixed frame 1 and only the fork F, staying on the vertically-movable frame 13, continues to be lowered.

5. In the meantime, the rod of the pusher P is moved backward by operation of the piston mechanism and thereafter a third piece of cargo C is pushed along by the pusher P to a standby position behind the piece B.

6. The ram V is raised to the topmost position by operation of the vertically-movable frame-tilting device 29.

7. At the same time, the ram 51 is dropped by a specified extent, thereby the fork transfer means 54 is tilted as indicated. One end of the fork transfer means 54 is held by the support member 49, while the other end of it is held by the ram 51 of the hydraulic cylinder 52. The top end of said support member 49 is linked via the pin 50 swingably to the appropriate end of the fork transfer means 54. Thus, vertical displacement of the ram 51 by operation of the cylinder 52 causes the fork transfer means 54 to turn around the pin 50 in the arrow direction of 54a – 54b in FIG. 8 (a).

In FIG. 8 (d):

8. The piece of cargo A is moved by the conveyor belt 4 installed on the fixed frame 1, toward the conveyor 59. The top surfaces of the conveyor belt 4 and 59 are located on the same horizontal plane and, the conveyor belt 59 and the conveyor belt 4 are driven at the same speed toward the same direction.

9. When the vertically-movable frame 13 is further lowered, the ram V of the vertically-movable frame -tilting device 29 is contacted and thereby the fall of the left side of the vertically-movable frame 13 is stopped but the right side continues to fall to the bottom-most position, where it comes to a halt in a state with its right side lower. By properly presetting the relation between the top-most position of the ram V and the end surface of said drop of the ram 51, it is possible to bring the respective top-surfaces of the vertically-movable frame 13 and fork transfer means 54 to an inclination with a specified angle, when the vertically-movable frame 13 comes to a halt with its right side down, as illustrated in FIG. 8 (d).

10. The fork, F, falling under gravity along the vertically-movable frame 13 and fork transfer means 54 hits the left end of transfer means 55 in FIG. 8 (d) and comes to a halt. Thereupon, the ram 51 is raised by the specified extent to bring the top surfaces of the fork transfer means 54 and transfer means 55 to the same horizontal plane thereby restoring the state of FIG. 8 (a), (b). Then the drive source (not shown) is closed to set the rollers 53 and 58 running said fork is carried on to, say, fork pool (not shown): Said rollers 53 and 58 are arranged respectively at specified intervals on the top surfaces of the fork transfer means 54 and 55 and they are driven at the same speed toward the same direction. If, in this case, it is so preset that the ram 51 can rise at specified speed as soon as the fork F, start moving under gravity, thereby bringing the top surfaces of the fork transfer means 54 and transfer means 58 to same horizontal plane, then the fork F, will be able to be smoothly moved onto the fork transfer means 54 or transfer means 55 without hitting the end of the transfer means 55. Thereafter said fork F will be able to move over the running rollers 53, 58 to the specified position.

To mount the fork F with a piece of cargo, the above-procedure is simply reversed. Namely, a piece of cargo is moved over conveyor belt 59 of FIG. 8 toward the device of the present invention and it is stopped on the conveyor belt 4 of the fixed frame 1 of the present invention. In this case, as indicated in FIG. 7 (b), the vertically-movable frame 13 is tilted to the left side and the top surfaces of the fork transfer means 54 and 55 are located on the same horizontal plane.

The fork moves over the rollers 58 and 53 to the device of the present invention and it stops on the fork transfer means 54 when the rollers 58 and 53 are simultaneously stopped. Thereafter the hydraulic ram 51 is raised by the specified extent to bring the top surfaces of the fork transfer means 54 and the vertically-movable frame 13 to an inclination with a specified angle and in consequence, the fork F can be moved under gravity onto the vertically-movable frame 13. The vertically-movable frame 13 is displaced upward by a vertical displacement mechanism and a piece on the fixed frame 1 is replaced onto the fork F. Thereafter the fork holding a replaced cargo is pushed by a pusher (not shown) of the same construction as the above-mentioned pusher P to the direction of the transfer means 56 and thereby said fork is moved over the free roller 57 provided on the transfer means 56 to the specified position. Incidentally, 591 and 592 are support members of the transfer means 593; and 561 and 562 are support members for the transfer means 56, 551 is support member for transfer means 55, and if necessary, a guide may be attached to said transfer means 54 and transfer means 55 to ensure smooth transition of the fork F onto or from the vertically-movable frame 13.

If the device according to the present invention is installed at a specified spot within, say, a plant, the following merit will be obtained.

Product carried on the production line or the packing line are unitized and then the unitized cargo is placed by a pusher P or the like onto the conveyor belt 4 of the fixed frame 1 in the present invention. Meanwhile, a fork is sent from, say, a fork pool onto the vertically-movable frame 13, which is then displaced upward. Thus the utilized cargo on the conveyor belt 4 of the fixed frame 1 is replaced onto the fork by the load-replacing system. The unitized cargo replaced onto the fork can be delivered over the rollers 57 of the transfer means 56 to a specified spot. Utilizing its slots b, said fork is attached to a forklift or a handlift at said specified spot. Said forklift or a handlift attached with said fork is moved by means of a known method to, say, a racked warehouse, where the unitized cargo is replaced from said fork onto the stationary mechanism of said racked warhouse by said load-replacing principal; or the cargo is directly replaced onto the stationary mechanism installed on a truck or a railway vehicle. Thereafter, the cargo is put through the consistent transportation line of mechanical handling described at the outset of the Specification.

The cargo reaching the destination on the truck or railway vehicle goes through the reversed process to the above. Namely, it is automatically sent without breaking the unit to a specified spot within a plant, for instance, replacement of the cargo takes place from the stationary mechanism of the railway vehicle to the fork attached to a forklift or a handlift by the load-replacing principal. Said fork is carried up to the device of the present invention; the fork is detached from said forklift or handlift; the fork is moved by the pusher P over the roller 57 of the transfer means 56 and then stopped on the rollers 11 of the vertically-movable frame 13. Vertically-movable frame 13 is displaced downward and thereby cargo leaves the fork and moves over the belt 59 of the transfer means 593 to a specified spot without breaking the unit.

As described above, the present invention makes it possible to transfer a unitized shipment without breaking the unit between the origin in said mechanical handling system and the consignor, between the destination in said mechanical handling system and consignee, or between the warehouse and these points, automatically and easily with virtually no use of human labor.

The present invention will thus be able to expand the applicabilities of said mechanical cargo handling system and contributes to its rapid dissemination.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

We claim:

1. An engage-disengage device for a cargo-transfer means having a plurality of parallel tines in a mechanical cargo handling system of the load-replacing type characterized in that the device comprises:

a. a fixed frame including rows of cargo-transport means arranged in parallel and spaced apart at a distance greater than the width of said tines with a transport mechanism that can carry cargo thereon;

b. a vertically-movable frame including transport means for the cargo-transfer means comprising at lease two arms extending parallel to the rows of said cargo transport means that can move vertically between the rows of said cargo-transport means said arms engaging at least two of said tines wherein said transport means for the cargo-transfer means, and said vertically movable frame is provided with a vertical displacement means for moving said transport means for the cargo-transfer means in the vertical space between said cargo-transport means.

2. The engage-disengage device for a cargo-transfer means of claim 1, wherein said cargo-transport means of the fixed frame consists of an endless conveyor belt having a horizontal part in said conveyor belt being slightly higher than the top surface of the fixed frame, and includes more than one free roller to keep in contact with the under side of the upper part of the conveyor belt.

3. The engage-disengage device for cargo-transfer means of claim 1, wherein said vertical displacement means comprises crossed arms, symetrically positioned around a center shaft, one pair of ends of said arms being coupled respectively at specified positions to one end of the vertically-movable frame and to the bottom of the vertical part of the fixed frame, and the other pair of ends of said arms being movable along guide means, and ram means for vertically moving said center shaft.

4. An engage-disengage device for a cargo-transfer means of claim 3, wherein said transport means for cargo-transfer means is equipped with a stopper means which arrests the downward displacement of said transport means by hitting the bottom of the other end of said vertically-movable frame when it has been displaced downward a predetermined amount whereby said transport mechanism can be tilted.

5. An engage-disengage device for a cargo-transfer means of claim 3, wherein the upper one of the other ends of said crossed arms can be moved along a guide means which is inclined upward at an angle.

* * * * *